United States Patent
Saito

[19]

[11] Patent Number: 5,914,935
[45] Date of Patent: Jun. 22, 1999

[54] TRAFFIC SHAPER APPARATUS

[75] Inventor: Takashi Saito, Tokyo, Japan

[73] Assignee: NEC Corporation, Tokyo, Japan

[21] Appl. No.: 08/808,413

[22] Filed: Feb. 28, 1997

[30] Foreign Application Priority Data

Feb. 29, 1996 [JP] Japan ................................. 8-042319

[51] Int. Cl.$^6$ ..................................................... H04L 7/00
[52] U.S. Cl. ........................ 370/229; 370/416; 370/253;
370/229; 340/825.52
[58] Field of Search ................................... 370/229, 230,
370/232, 234, 235, 395, 396, 397, 398,
399, 237, 412, 465, 468, 428, 429, 516,
517, 416, 253; 340/825.52

[56] References Cited

U.S. PATENT DOCUMENTS

| 5,107,260 | 4/1992 | Meissner et al. | 340/825.52 |
| 5,581,546 | 12/1996 | Roosma et al. | 370/253 |
| 5,774,466 | 6/1998 | Hanmamoto et al. | 370/416 |

OTHER PUBLICATIONS

"Development of UPC and Shaping LSI for ATM network", Proceedings of the 1995 Communications Society Conference of the Institute of Electronics, Information and Communication Engineers, Communication Technical Report, B–560, p. 227, Sep. 1995.

Primary Examiner—Jeffery A. Hofsass
Assistant Examiner—Daniel Previl
Attorney, Agent, or Firm—Sughrue, Mion, Zinn, Macpeak & Seas, PLLC

[57] ABSTRACT

A traffic shaper apparatus includes a ring memory, a counter, a schedule circuit, first-priority available area determining circuits, and a storage area determining circuit. The ring memory has a plurality of storage areas for storing cells to be transmitted to an asynchronous transfer mode (ATM) communication network. The counter performs read control of cells at a predetermined read rate by cyclically accessing the storage areas in the ring memory. The schedule circuit obtains an ideal transmission time of a cell to be transmitted to the ATM communication network in accordance with input of a cell. The first-priority available area determining circuits are arranged in correspondence with a plurality of sectors obtained by grouping the storage areas in the ring memory to concurrently search for available storage areas in the respective sectors from which cells are read out at times nearest the ideal transmission time. The storage area determining circuit searches the respective search results obtained by the first-priority available area determining circuits for an available storage area from which a cell is read out at the time nearest the ideal transmission time.

9 Claims, 7 Drawing Sheets

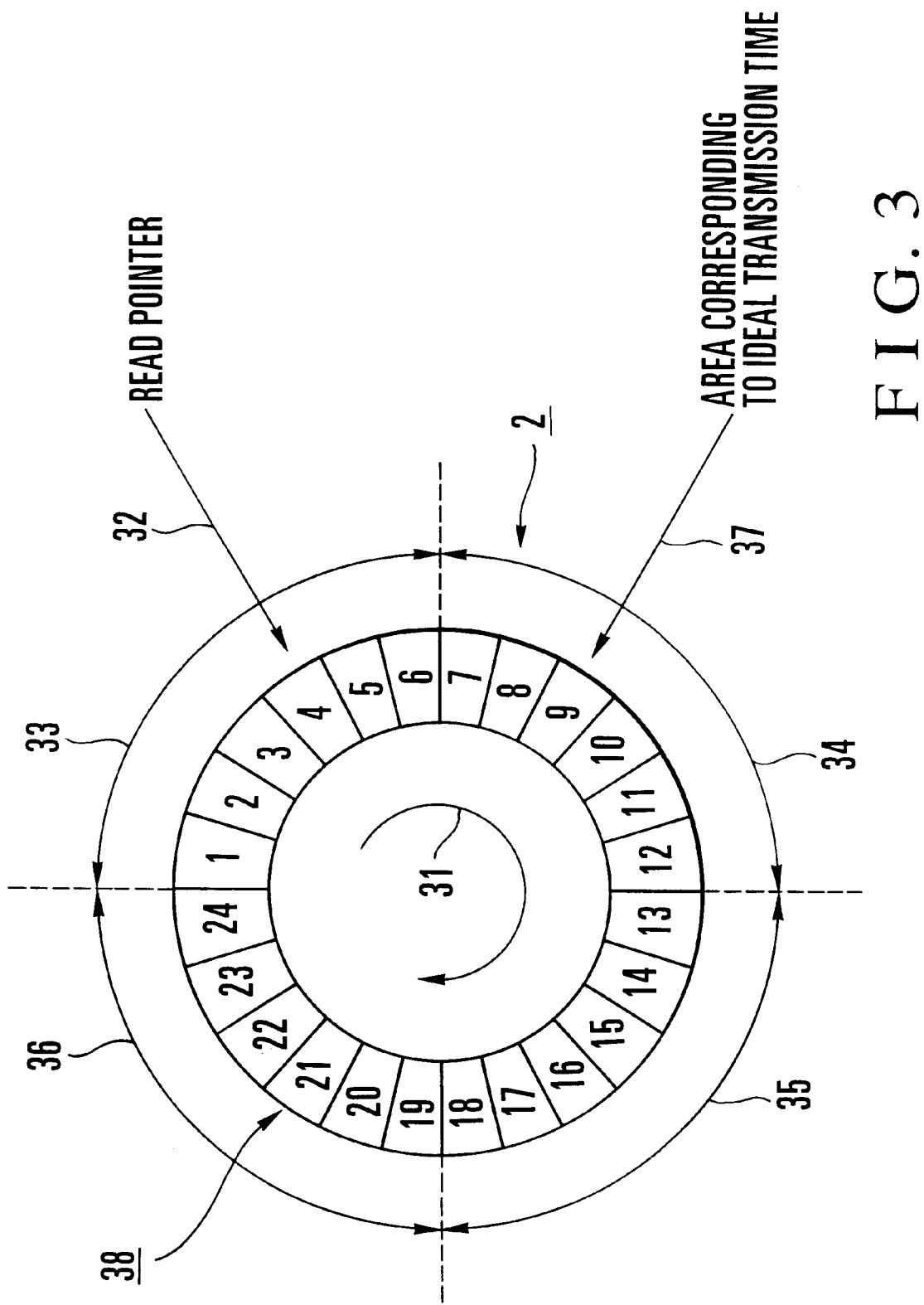
F I G. 3

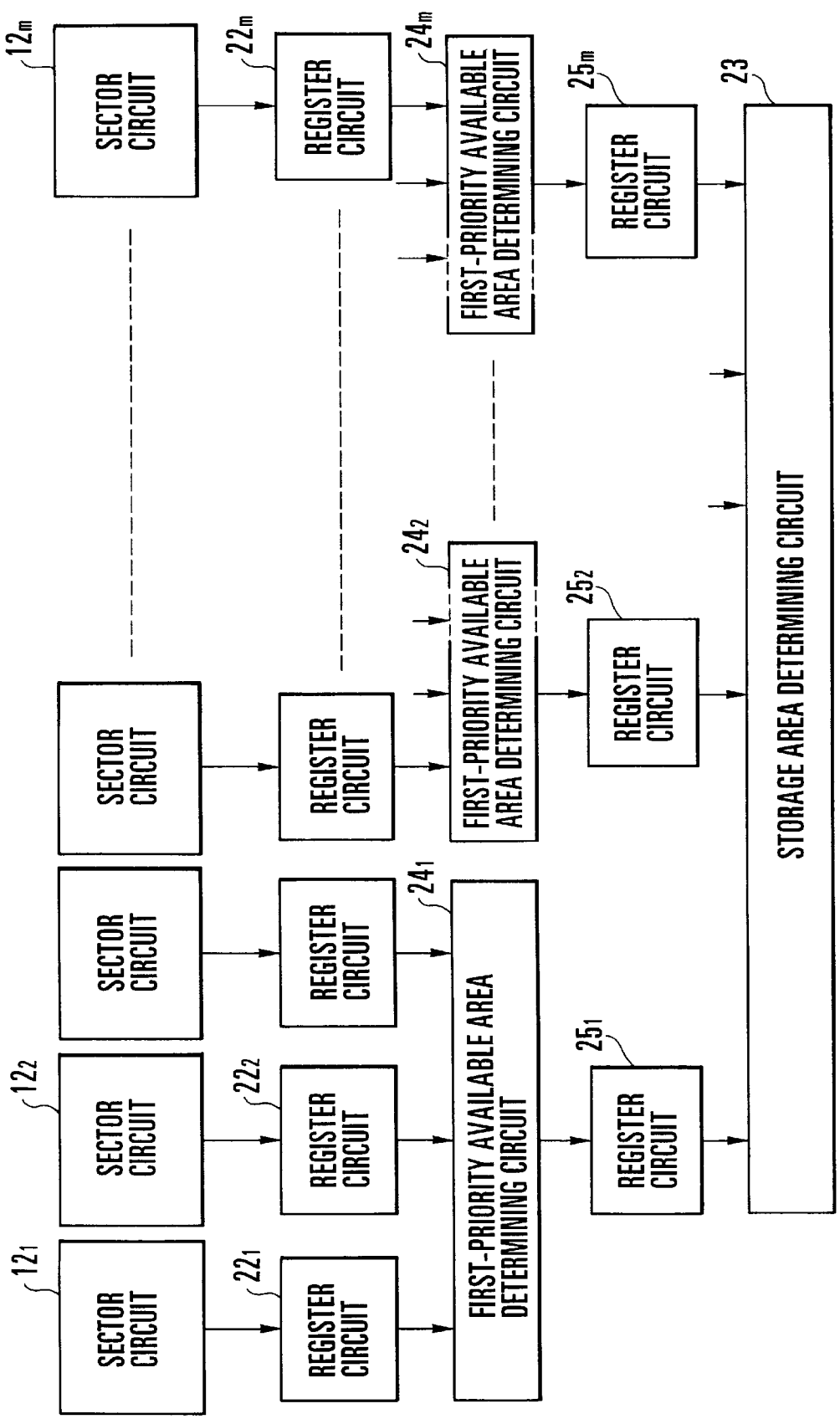
F I G. 5

TRAFFIC SHAPER APPARATUS

BACKGROUND OF THE INVENTION

The present invention relates to a traffic shaper apparatus for reducing cell variations by stabilizing the transmission timing of a cell as a unit of transmission in communication based on an asynchronous transfer mode and, more particularly, to a traffic shaper apparatus for reducing cell variations by obtaining the optimal transmission time of each cell, searching an output buffer, from which cells are cyclically read out at a predetermined rate, for an available area from which a cell is read out at the time nearest the optimal transmission time, and storing a cell in the available area.

In the asynchronous transfer mode, information is transmitted in units of relatively small packets, each consisting of fixed-length data called a cell. In performing communication based on the asynchronous transfer mode, the band can be freely changed even during communication by changing the number of cells transmitted per unit time. Each cell is switched by a node in a network to be transmitted to a target terminal. Since the transmission rate of cells varies depending on the amount of information, each node includes a buffer memory for temporarily storing cells. Incoming cells are temporarily stored in this buffer memory. Thereafter, the cells are transmitted in the order of arrival.

If the number of incoming cells momentarily increases, and the buffer memory of the node overflows, the cells are discarded in the order of increasing priority. In order to reduce the number of cells discarded, an apparatus on the transmission side, which transmits cells to a node is required to control the number of cells transmitted to a predetermined rate in a predetermined band within which no overflow occurs on the reception side. Processing of controlling the transmission rate of cells to a predetermined rate is called shaping. An apparatus for performing shaping is called a traffic shaper.

Shaping of cells must be performed in units of virtual paths which are indicated by pieces of information attached to the header portions of cells. In addition, since different bands are set for different virtual paths, the ideal cell transmission cycles vary from virtual path to virtual path. For example, a given virtual path is required to perform transmission of three cells at a time, whereas another virtual path is required to perform transmission of two cells at a time. For this reason, these virtual paths may contend with each other in terms of the ideal cell transmission time. The traffic shaper apparatus therefore has a function of arbitrating between virtual paths when their ideal transmission times overlap. A traffic shaper apparatus having such an arbitration function is disclosed in "Development of UPC and Shaping LSI for ATM network", PROCEEDINGS OF THE 1995 COMMUNICATIONS SOCIETY CONFERENCE OF THE INSTITUTE OF ELECTRONICS, INFORMATION AND COMMUNICATION ENGINEERS, COMMUNICATION TECHNICAL REPORT, B-560, p. 227, September, 1995.

FIG. 6 shows an outline of the arrangement of a conventional traffic shaper apparatus. A traffic shaper apparatus 101 includes a ring memory 102 for temporarily buffering cells to be transmitted, and a schedule section 103 for obtaining the ideal transmission time of each cell. The ring memory 102 includes a predetermined number of storage areas for storing cells. An identification number is assigned to each storage area.

A counter 104 sequentially and repeatedly counts identification numbers up to the total number of storage areas in the ring memory 102. The count value of the counter 104 indicates a value corresponding to the read pointer of the ring memory 102. Cells are cyclically read out from the ring memory 102 at a predetermined rate in accordance with the counting of the counter 104. The cells read out from the ring memory 102 are sequentially output to a transmission path.

A contention control circuit 105 includes register circuits 111 equal in number to the storage areas in the ring memory 102. Each register circuit 111 stores 1-bit flag information indicating whether a corresponding storage area of the ring memory 102 is available or not. A decoder 106 receives information about the ideal transmission time from the schedule section 103, and obtains an identification number corresponding to the area, in the ring memory 102, from which a cell is read out at the time. The decoder 106 also decodes the obtained identification number, and outputs a start position signal indicating the search start position to the corresponding register circuit 111 of the contention control circuit 105. Upon reception of the start position signal from the decoder 106, the contention control circuit 105 checks the flag information in the corresponding register circuit 111 to determine whether the corresponding area is available or not.

If the area is available, the contention control circuit 105 changes the flag information in the corresponding register circuit 111 into information indicating that the area is not available. At the same time, the contention control circuit 105 stores the cell in the corresponding storage area in the ring memory 102. If the ideal storage area is not available, the contention control circuit 105 sequentially searches the register circuits 111 for an available area in the direction in which the transmission time becomes later, and stores the cell in the corresponding area in the ring memory 102.

FIG. 7 shows an example of a search procedure by which the contention control circuit in FIG. 6 searches for an available area. The contention control circuit includes register circuits $111_{21}$ to $111_{32}$ equal in number to the storage areas in the ring memory 102. Each register circuit stores flag information indicating whether a corresponding area in the ring memory 102 is available or not. FIG. 7 shows some of the N register circuits. Identification numbers "adr. 21" to "adr. 32" are respectively assigned to the register circuits $111_{21}$ to $111_{32}$.

The flag information held in each register circuit is notified to the register circuit on the subsequent state in the direction in which cells are read out from the ring memory 102. Referring to FIG. 7, each register circuit in which "1" is written indicates that a corresponding area is not available, and each register circuit in which "0" is written indicates that a corresponding area is available.

Assume that the identification number of the area corresponding to the ideal transmission time of the current cell is "adr. 24". In this case, a search is started from the register circuit $111_{24}$ corresponding to this identification number. Referring to FIG. 7, a search route is indicated by a dotted line 112. In this case, since the register circuit $111_{24}$ as the search start point is not available, the search proceeds in the direction in which the identification number increases (the readout time order). The register circuits up to the register circuit $111_{28}$ with "adr. 28" are not available, and the register circuit $111_{29}$ with "adr. 29" is the first available register circuit after the search is started. The area indicated by the identification number "adr. 29" is therefore determined as the current cell storage area.

Subsequently, the contention control circuit 105 changes the flag information in the register circuit $111_{29}$ into "1"

indicating that the corresponding area is not available, and passes the identification number "adr. 29" as write address information to the ring memory 102. As described above, if the area corresponding to the ideal transmission time has already been used by a cell on another virtual path, a sequential search is performed toward the future to find an available storage area from which a cell is read out at the time nearest the ideal transmission time.

A series of operations of obtaining an ideal transmission time, searching out an available area closest to the ideal transmission time, and storing a cell in the area must be completed within a time interval in which each cell arrives. However, in a conventional traffic shaper apparatus, since a sequential search is started from the position (area) corresponding to the ideal transmission time to find an available area, if unavailable areas continue, it takes time to fine an available area. For this reason, the ring memory 102 having a relatively small storage capacity must be used to complete a search within a one-cell time. Therefore, cell delay variation (CDV) cannot be sufficiently reduced.

SUMMARY OF THE INVENTION

It is an object of the present invention to provide a traffic shaper apparatus which can search a buffer memory for an area, in which a cell is to be stored, within a short period of time.

In order to achieve the above object, according to the present invention, there is provided a traffic shaper apparatus comprising a ring memory having a plurality of storage areas for storing cells to be transmitted to an asynchronous transfer mode (ATM) communication network, read control means for performing read control of cells at a predetermined read rate by cyclically accessing the storage areas in the ring memory, transmission time calculating means for obtaining an ideal transmission time of a cell to be transmitted to the ATM communication network in accordance with input of a cell, a plurality of first search means, arranged in correspondence with a plurality of sectors obtained by grouping the storage areas in the ring memory, for concurrently searching for available storage areas in the respective sectors from which cells are read out at times nearest the ideal transmission time, and second search means for searching the respective search results obtained by the first search means for an available storage area from which a cell is read out at a time nearest the ideal transmission time.

BRIEF DESCRIPTION OF THE DRAWINGS

FIG. 3 is a view for explaining the relationship between a ring memory and each sector circuit in FIG. 1;

FIG. 5 is a block diagram showing another example of the arrangement of the contention control circuit in FIG. 1;

DESCRIPTION OF THE PREFERRED EMBODIMENT

The present invention will be described in detail with reference to the accompanying drawings.

Figure 1:
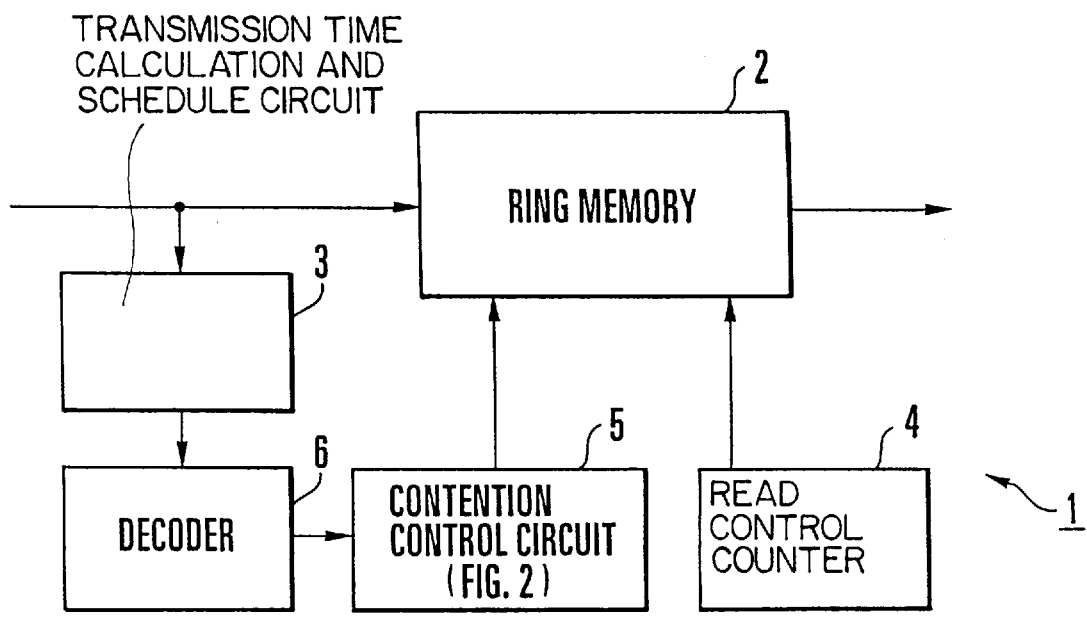
FIG. 1 is a block diagram showing the schematic arrangement of a traffic shaper apparatus according to an embodiment of the present invention.
Figure 6:
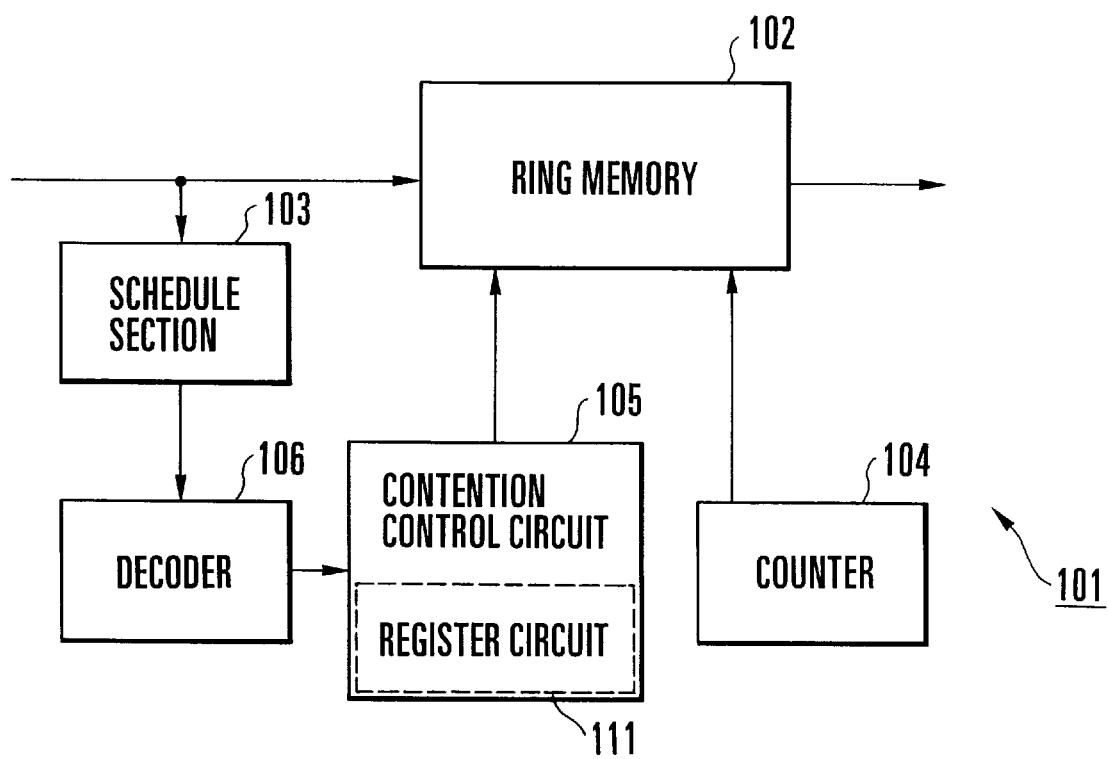
FIG. 6 is a block diagram showing the schematic arrangement of a conventional traffic shaper apparatus.
Figure 7:
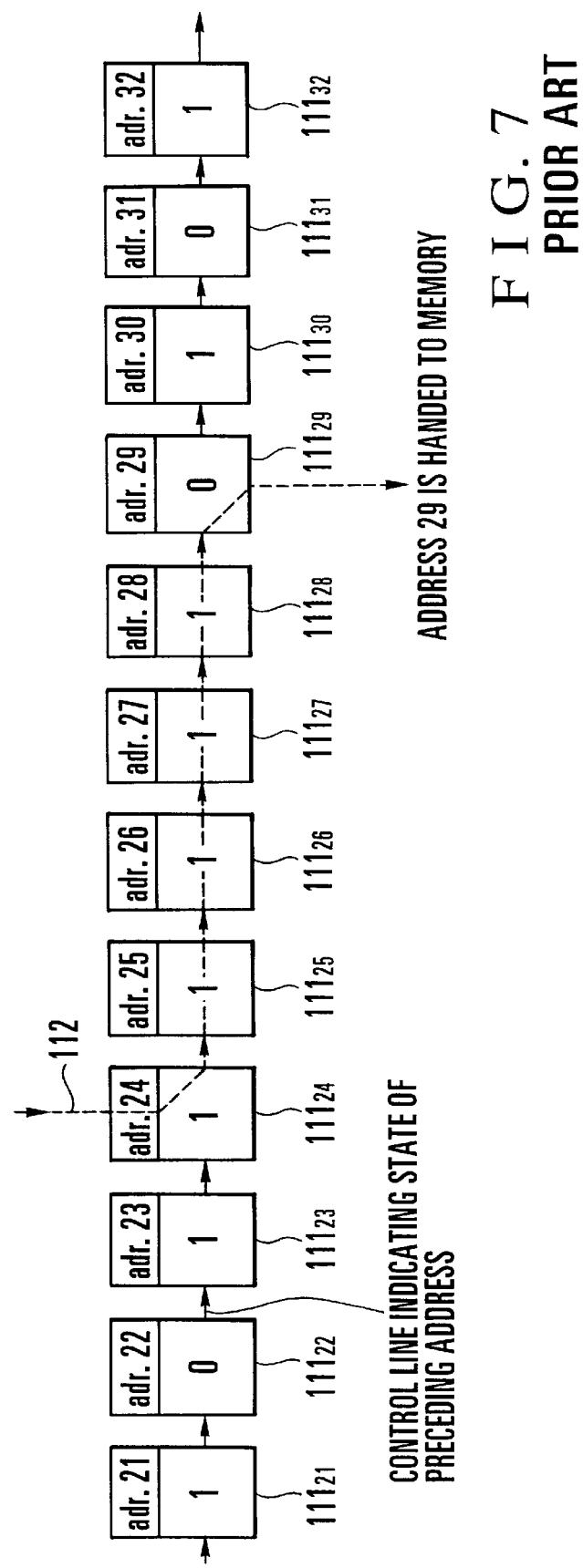
FIG. 7 is a block diagram for explaining an example of the procedure by which a contention control circuit in FIG. 6 searches for an available area.

FIG. 1 shows the schematic arrangement of a traffic shaper apparatus according to an embodiment of the present invention. Referring to FIG. 1, a traffic shaper apparatus 1 is constituted by a ring memory 2, a schedule circuit 3, a counter 4, a contention control circuit 5, and a decoder 6. The ring memory 2 has n×m (n and m are positive integers) storage areas for storing cells. The identification numbers "1" to "n×m" are assigned to the respective storage areas in the ring memory 2. Cells are read out from the ring memory 2 at a predetermined rate in the direction in which the identification number increases, and the readout cells are sequentially output to a transmission path. Note that the arrangement constituted by the schedule circuit 3, the counter 4, and the decoder 6, excluding the ring memory 2 and the contention control circuit 5, is the same as that shown in FIG. 6, and hence a description thereof will be omitted.

Figure 2:
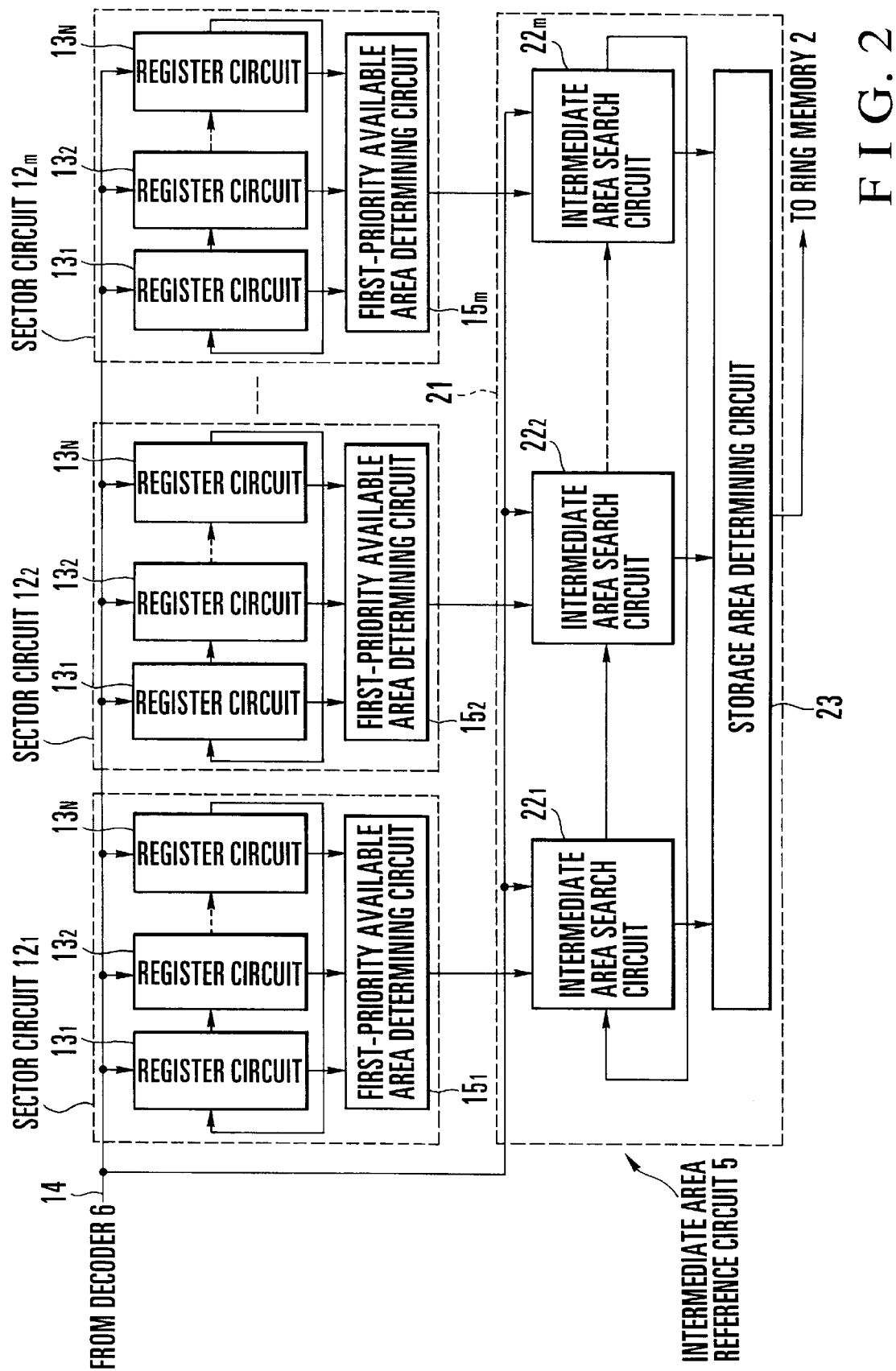
FIG. 2 is a block diagram showing the arrangement of a contention control circuit in FIG. 1.

FIG. 2 shows the arrangement of the contention control circuit 5 in FIG. 1. The contention control circuit 5 includes first to mth sector circuits $12_1$ to $12_m$ for managing the use states in the m sectors of the ring memory 2, each of which consists of n areas. The first sector circuit $12_1$ manages the use states of the areas having the identification numbers "1" to "n". The second sector circuit $12_2$ manages the use states of the areas having the identification numbers "n+1" to "2n". Similarly, each sector circuit manages the n areas in the order of the identification numbers.

Each of the sector circuits $12_1$ to $12_m$ includes first to nth register circuits $13_1$ to $13^N$ for storing pieces of flag information indicating whether the respective areas in the ring memory 2 are available. The register numbers "1" to "n" are respectively assigned to the register circuits $13_1$ to $13_N$ of each of the sector circuits $12_1$ to $12_m$. The identification number of each storage area in the ring memory 2 can be obtained from a sector number and a register number. For example, the register circuit, in the second sector circuit $12_2$, which has the register number "4" corresponds to the area having the identification number "(2−1)×n+4".

In each of the sector circuits $12_1$ to $12_m$, the contents held in each register circuit is notified to the register circuit on the subsequent stage in accordance with the direction in which cells are read out from the ring memory 2. A start position signal 14 indicating the search start position is input from the decoder 6 to each of the register circuits $13_1$ to $13_N$. Only the start position signal 14 for designating the register circuit corresponding to the ideal transmission time of the cell to be currently stored is set in the active state.

The sector circuits $12_1$ to $12_m$ respectively include first-priority available area determining circuits $15_1$ to $15_m$ each serving to search for the register circuit corresponding to the available area from which a cell is read out at the ideal transmission time or the first available area of the areas from which cells are read out after the ideal transmission time. That is, if there is no register circuit designated by the start position signal 14 in a given sector circuit, the corresponding first-priority available area determining circuit searches the sector in the ascending register number order to select the first one of the register circuits corresponding to available storage areas.

If there is a register circuit designated by the active start position signal 14 in a given sector circuit, the corresponding first-priority available area determining circuit searches the two portions of the sector which are divided from each other through the designated register circuit as the boundary. In one portion, the first-priority available area determining circuit selects the first register circuit corresponding to an available storage area from the register circuits having register numbers smaller than the register number of the register circuit designated by the active start position signal 14. In the other portion, the first-priority available area determining circuit selects the first register circuit corresponding to an available storage area from the register circuits located after the register circuit designated by the active start position signal 14. Searches are performed in such two portions in this manner because a register circuit whose register number is smaller than that of the register circuit designated by the active start position signal 14 is a register circuit with low search priority which corresponds to the storage area from which a cell is read out last in one read cycle in the ring memory 2.

The contention control circuit 5 has an intermediate area search circuit 21 for searching for the area from which a cell is read out at the time nearest to the ideal transmission time in the direction of future among the search results obtained by the sector circuits $12_1$ to $12_m$ in units of sectors. The intermediate area search circuit 21 includes first to mth intermediate area register circuits $22_1$ to $22_m$ for holding the search results from the first to mth sector circuits $12_1$ to $12_m$, and a storage area determining circuit 23 for searching for one of the first to mth intermediate area register circuits $22_1$ to $22_m$ which corresponds to the transmission time nearest to the ideal transmission time in the direction of future.

The start position signal 14 is input from the decoder 6 to each of the first to mth intermediate area register circuits $22_1$ to $22_m$. The storage area determining circuit 23 sequentially searches the intermediate area register circuits from the intermediate area register circuit designed by the active start position signal 14 in the read direction in which the identification number increases. The storage area determining circuit 23 obtains the identification number of the finally selected area from the sector number and the register number, and outputs the identification number to the ring memory 102. The ring memory 102 stores the cell to be currently stored in the storage area whose address corresponds to the identification number received from the storage area determining circuit 23.

When the ideal transmission time of the cell is obtained by the schedule circuit 3, and the start position signal 14 indicating the corresponding area is output from the decoder 6, the sector circuits $12_1$ to $12_m$ simultaneously search the respective sectors for the first available areas. The search results obtained by the sector circuits $12_1$ to $12_m$ are respectively stored in the first to mth intermediate area register circuits $22_1$ to $22_m$ in the intermediate area search circuit 21. Upon finding a register circuit in the available state, each of the sector circuits $12_1$ to $12_m$ outputs the corresponding register number. If no available area is searched out, each sector circuit outputs "0" as the search result.

Upon reception of all the search results from the sector circuits $12_1$ to $12_m$, the intermediate area search circuit 21 searches the search results from the sector circuits $12_1$ to $12_m$, starting from the intermediate area register circuit 22 to which the active start position signal 14 has been input, for the available area corresponding to the transmission time nearest to the ideal transmission time in the direction of future. That is, the intermediate area search circuit 21 sequentially searches the first to mth intermediate area register circuits $22_1$ to $22_m$ designated by the active start position signals 14 for an area whose contents are not "0".

Upon searching out the area whose contents are not "0", the intermediate area search circuit 21 obtains an identification number from the stored register number and the sector number corresponding to the intermediate area register in which the register number is stored, and outputs the obtained identification number to the ring memory 102. In this manner, a search for a storage area in which a cell is to be stored is performed in the two steps, i.e., the search step performed by the sector circuits $12_1$ to $12_m$ and the search step performed by the intermediate area search circuit 21 on the basis of the search results.

FIG. 3 schematically shows the relationship between the ring memory 2 and each of the sector circuits $12_1$ to $12_m$. Cells are sequentially read out from the ring memory 2 at a predetermined rate in the direction indicated by an arrow 31. The count value of the counter 4 corresponds to a read pointer 32 of the ring memory 2. In this case, the ring memory 2 has areas 38 capable of storing 24 cells. The identification numbers "1" to "24" are assigned to the respective areas 38. The areas 38 in the ring memory 2 are grouped into first to fourth sectors 33 to 36 each consisting of six areas. A search is performed for the first available area in the read direction indicated by the arrow 31, starting from an area 37 corresponding to the ideal transmission time.

Figure 4:
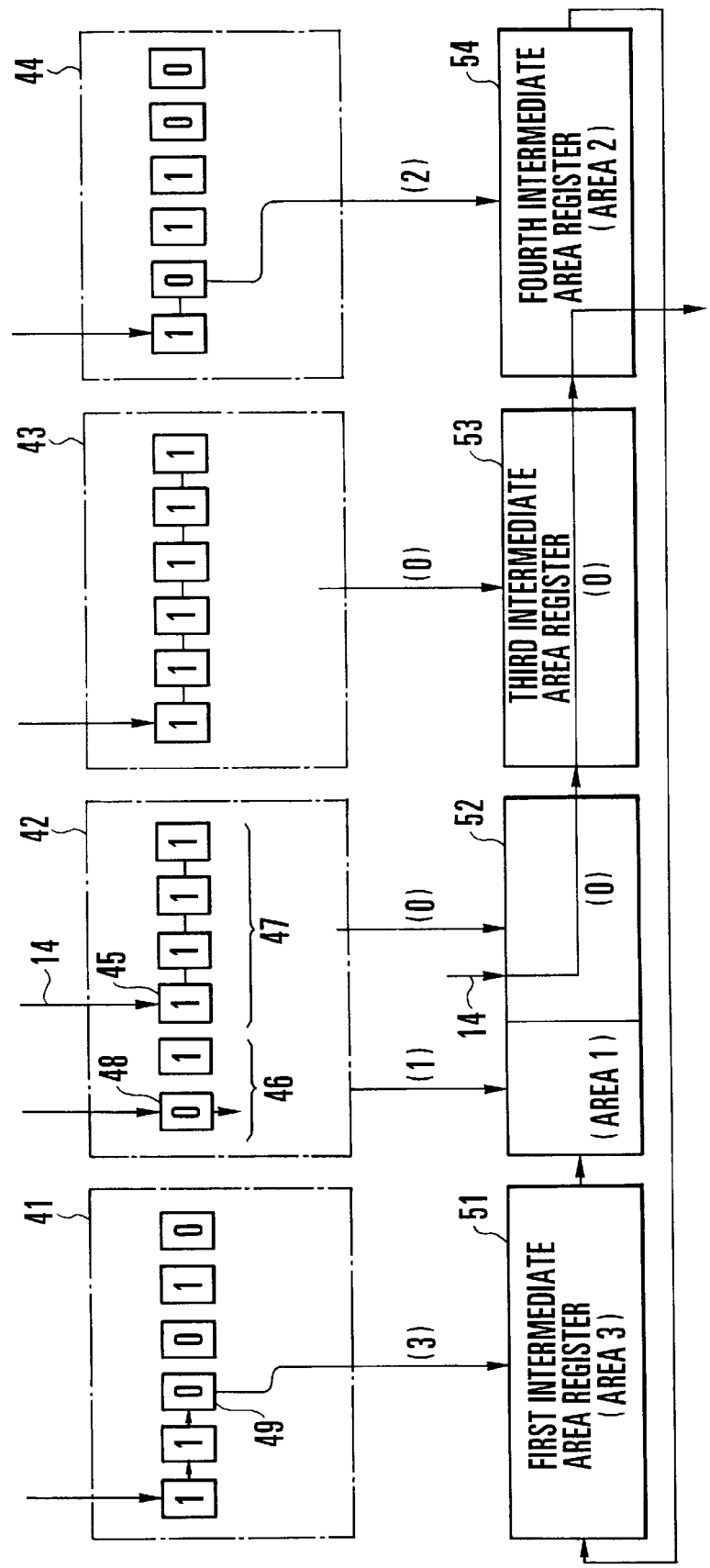
FIG. 4 is a block diagram for explaining an example of the procedure by which the contention control circuit in FIG. 1 searches for an available area.

FIG. 4 schematically shows an example of the procedure by which the contention control circuit 5 searches for an available area. In this case, search processing is performed such that the 24 areas are grouped into four sectors each consisting of six areas, as in the ring memory 2 shown FIG. 3. In first to fourth sectors 41 to 44, each rectangle indicated by "1" or "0" represents a register circuit. "1" indicates that the corresponding area is not available, and "0" indicates that the corresponding area is available. The register numbers "1" to "6" are sequentially assigned to the respective register circuits in each of the sectors 41 to 44 from the left side in FIG. 4.

Assume that the search start position corresponding to the ideal transmission time of the cell to be currently stored corresponds to a register circuit 45 in the second sector 42. The start position signal 14 input to the register circuit 45 is therefore active. Upon reception of the start position signals 14 from the decoder 6, the first to fourth sectors 41 to 44 simultaneously start to search for available areas in the respective sectors. In this case, the second sector 42, which has received the active start position signal 14, separately searches a first group 46 having smaller identification numbers (register numbers) than the identification number of the register 45 at the start position, and a second group 47 including the register circuit 45 at the start position and the subsequent register circuits.

The sector may concurrently search the first and second groups 46 and 47. Alternatively, the sector may search the first group 46 first, and then the second group 47. This is because, the total time required to search the first and second groups 46 and 47 is equal to the time required for the remaining sectors to search all the register circuits.

In the first group 46 of the second sector 42, a register circuit 48 subjected to search processing first exhibits an available state so "1" is output as the register number of the first available area. In the second group 47 of the second sector 42, a search is started from the register 45 as the start position. Since there is no available area in the second group 42, "0" is output as the search result.

In the sectors 41, 43, and 44 other than the second sector 42, the start position signal 14 is no longer active. For this reason, in each sector, a sequential search is performed from the register circuit corresponding to the area from which a cell is read out first, i.e., the register circuit on the left side in FIG. 4 which has the smallest register number. In the first sector 41, since a third register circuit 49 from the left side is in the available state, the register number "3" assigned thereto is output. Similarly, in the fourth sector 44, the register number "2" is output as the number corresponding to the area from which a cell is read out first. In the third sector 43, since all the register circuits in the unavailable state, "0" is output as the search result.

The search result obtained by the first sector 41 is stored in a first intermediate area register circuit 51. The search results in the first and second groups 46 and 47 of the second sector 42 are stored in a second intermediate area register circuit 52. Similarly, the search result obtained by the third sector 43 is stored in a third intermediate area register circuit 53. The search result obtained by the fourth sector 44 is stored in a fourth intermediate area register circuit 54. With this processing, the first search step is completed.

Since the start position signal 14 input to the second intermediate area register circuit 52 is active, the intermediate area search circuit 21 performs a sequential search from the research result corresponding to the second group of the second intermediate area register 52 as a start point in the read direction. If the research result stored in the second intermediate area register 52 is "0", the search proceeds to the next intermediate area register 53. If the search result other than "0" is searched out first, the corresponding area is determined as the first available area.

In this case, since both the search result corresponding to the second group of the second intermediate area register circuit 52 and the search result stored in the third intermediate area register circuit are "0", the search proceeds to the fourth intermediate area register circuit 54. The search result stored in the fourth intermediate area register circuit 54 indicates the register number "2". The area corresponding to this register number is therefore determined as the first available area. The intermediate area search circuit 21 calculates an identification number according to:

(sector number−1)×(number of register circuits per sector)+acquired register number and, passes the calculated identification number to the ring memory 2. In this case, the intermediate area search circuit 21 obtains "20" as the identification number according to (4−1)×6+2

In this manner, searches for the first available areas are simultaneously performed in the sectors 41 to 44, and the search results obtained in the respective sectors 41 to 44 are further searched. That is, search processing is performed in multiple steps in this manner to shorten the search time. Letting T1 be the time required to search for one register circuit, and n×m be the number of areas in the ring memory 2, the maximum search time can be given by T1×m×n. Search processing is performed with respect to m sectors each consisting of n areas, and these search results are searched in two steps. As a result, the search time becomes T1×(n+m), and hence the search time is shortened.

In the above embodiment, search processing is performed in two steps. However, search processing may be performed in three or more steps. If search processing is performed in three steps, the intermediate area register circuits $22_1$ to $22_m$ may be further divided into a plurality of sectors. In addition, first available area determining circuits $24_1$ to $24_n$ and register circuits $25_1$ to $25_n$ may be used as second-step search means for simultaneously and concurrently performing searches in units of sectors.

In the above embodiment, sectors are permanently divided and assigned in accordance with the respective areas in the ring memory 2. However, sectoring may be dynamically performed with reference to a start position. If sectoring is permanently performed, a sector corresponding to a start position must be divided into two parts, as shown in FIG. 4. If sectoring is dynamically performed with reference to a start position as a start point, search processing can be performed without dividing one sector into two parts, thereby simplifying the search procedure.

In this embodiment, search processing is performed with respect to all the areas in the ring memory 2. If, however, areas from which cells are read out after the current time and before the ideal transmission time are set as areas for which search processing is not performed, transmission of cells before the ideal transmission time can be prevented. If a cell is transmitted before the ideal transmission time, the cell transmission cycle can be shortened accordingly. If, therefore, areas from which cells are read out in the time interval between the current time and the ideal transmission time are set as areas for which search processing is not performed, the possibility that cells are discarded at a node on the reception side can be reduced.

As described above, according to the present invention, since the storage areas in the ring memory are grouped into two or more sectors, and search processing is simultaneously and concurrently performed with respect to the sectors, the search time can be shortened as compared with a case wherein all the storage areas in the ring memory are sequentially searched.

In addition, since search results are classified into two or more groups, and search processing is simultaneously and concurrently performed with respect to the groups in plurality of steps, the search time can further be shortened.

If a storage area corresponding to the transmission time is present in a given sector, the sector is divided into two portions with the storage area being the boundary between the portions, and search processing is performed with respect to the two portions. An optimal available area can be searched out more accurately.

Furthermore, since sectoring is dynamically performed with reference to the transmission time as a start point, even if a sequential search is to be performed with respect to a given sector in the read direction, the sector need not be divided into two portions.

Moreover, since storage areas from which cells are read out in the time interval between the current time and the transmission time are set as areas for which search processing is not performed, no cells are read out before the transmission time, thereby preventing the cell transmission cycle from being shortened.

What is claimed is:

1. A traffic shaper apparatus comprising: a ring memory having a plurality of storage areas for storing cells to be transmitted to an asynchronous transfer mode (ATM) communication network;

read control means for performing read control of cells at a predetermined read rate by cyclically accessing the storage areas in said ring memory;

transmission time calculating means for obtaining an ideal transmission time of a cell to be transmitted to the ATM communication network in accordance with input of the cell;

a plurality of first search means, arranged in correspondence with a plurality of sectors obtained by grouping the storage areas in said ring memory, for concurrently searching for available storage areas in the respective sectors from which cells are read out at times nearest the ideal transmission time; and second search means for searching the respective search results obtained by said first search means for an available storage area from which a cell is read out at a time nearest the ideal transmission time.

2. A traffic shaper apparatus according to claim 1, wherein said second search means comprises:

a plurality of divisional search means for classifying search results from preceding stages including said first search means into a plurality of groups, and concurrently searching the respective groups for available storage areas from which cells are read out at times nearest the ideal transmission time; and storage area determining means for searching the respective search results from said divisional search means for an available storage area, as an optimal storage area, from which a cell is read out at a time nearest the ideal transmission time.

3. A traffic shaper apparatus according to claim 1, wherein said first search means classifies storage areas in an assigned sector into a first group of storage areas from which cells are read out after the ideal transmission time, and a second group of remaining storage areas, when the sector includes a storage area from which a cell is read out at the ideal transmission time, and searches the respective groups for available storage areas from which cells are read out at times nearest to the ideal transmission time.

4. A traffic shaper apparatus according to claim 3, wherein said first search means performs a sequential search with respect to all the storage areas in an assigned sector in the same direction as a read direction of said ring memory when the assigned sector includes no storage area from which a cell is read out at the ideal transmission time.

5. A traffic shaper apparatus according to claim 1, further comprising:

a plurality of first register means, arranged in correspondence with the storage areas in said ring memory, for storing availability information about the storage areas, said first register means having register numbers in units of sectors; and a plurality of second register means arranged in correspondence with said first search means, said second register means storing one of information received from said first search means and indicating that there is no available area and a register number at which availability information is stored, and wherein said first and second search means search for available areas on the basis of pieces of information from said first and second register means.

6. A traffic shaper apparatus according to claim 5, wherein said first search means checks each information in said first register means, selects a register number corresponding to a first available area and stores the register number in said second register means when availability information is stored, and stores, in said second register means, information indicating that there is no available area, when no availability information is stored, and wherein said second search means selects one of the register numbers stored in said second register means which corresponds to the first available area, and designates a storage area corresponding to the selected register number in said ring memory.

7. A traffic shaper apparatus according to claim 1, wherein the storage areas in said ring memory are permanently grouped into a plurality of sectors.

8. A traffic shaper apparatus according to claim 1, wherein every time an ideal transmission time is obtained by said transmission time calculating means, the storage areas in said ring memory are grouped into a plurality of sectors with reference to a storage area, as a start point, which corresponds to the ideal transmission time every time.

9. A traffic shaper apparatus according to claim 1, wherein said first search means regards storage areas from which cells are read out in the time interval between a current time and an ideal transmission time as areas for which no search processing is performed.

* * * * *